Figure 2:
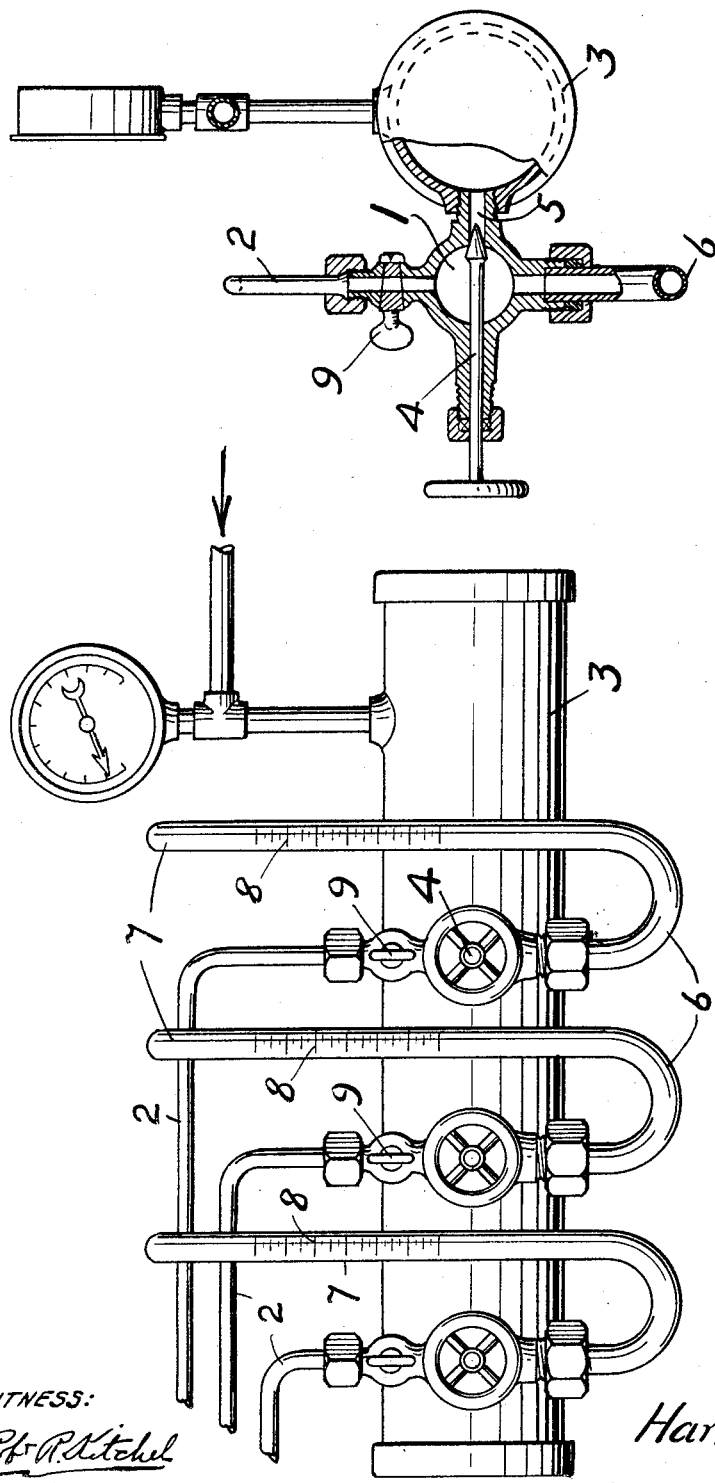

May 30, 1933. H. C. COLE 1,911,351
MEANS FOR MEASURING THE RATE OF DISCHARGE OF LIQUID
Filed May 7, 1930

FIG.I.

WITNESS:

INVENTOR
Harry C. Cole
BY
Augustus B. Stoughton
ATTORNEY.

Patented May 30, 1933

1,911,351

UNITED STATES PATENT OFFICE

HARRY C. COLE, OF PHILADELPHIA, PENNSYLVANIA

MEANS FOR MEASURING THE RATE OF DISCHARGE OF LIQUID

Application filed May 7, 1930. Serial No. 450,353.

There are situations in the arts where liquid is discharged against atmospheric pressure, usually in the form of a number of sprays or jets supplied from a common manifold with liquid under pressure, and, while the jets or sprays are independently regulated, it is desirable to measure the rate of discharge of liquid through each. An example of such a device occurs in machines which are used for spraying liquid onto traveling sheets or webs. An instance, but not the only example, is a machine for spraying melted paraffine onto printed sheets of paper, as they leave the press, in order to prevent offset. Other instances will occur to those skilled in the art.

The object of the present invention is to provide a simple, reliable and efficient apparatus for measuring the rate of discharge from each of such sprays so that the latter may be accurately and individually controlled and regulated.

Other objects of the invention will appear from the following description at the end of which the invention will be claimed.

In the following description reference will be made to the accompanying drawing forming part hereof and in which Figure 1 is an elevational view, and Fig. 2 is an end view of Fig. 1 with parts in section.

In the drawing 1 indicates a chamber. In the complete device there are usually a number of such chambers but a description of one will be sufficient. 2 is a pipe communicating with said chamber and arranged to discharge against constant back pressure such as the atmosphere. Usually the pipe 2 communicates with a spray device, not shown because too well understood to require illustration. 3 is a means, shown as a manifold common to all the chambers 1, and it communicates with the chambers and supplies liquid under pressure to them. The pressure in the manifold is held constant. The pressure gauge shown communicating with the manifold 3 indicates the presence of a liquid supply in the manifold and shows that the pressure is constant. 4 is a valve shown as a needle valve and it serves to regulate the size of the communication 5 from the manifold to the chamber 1 and the operation may be described by saying that when the valve 4 is additionally opened the fluid pressure in the chamber 1 goes up, because to flow a larger quantity of liquid, or to increase the rate of flow through the pipe 2 of operatively fixed cross section or flow area, requires an increased pressure in the chamber 1. The pressure in the manifold 3 is not less than the pressure in any one of the chambers 1 and is greater. 6 is a U-tube containing the same liquid that is supplied to and discharged from the chamber 1. One end of the U-tube communicates with the lower portion of the chamber 1 and the other upright end 7 of the tube is sealed and contains an air column trapped by the liquid in the lower portion of the U-tube. The U-tube, or more particularly the upright portion 7 thereof, is transparent so that the level of the liquid in it can be referred to the graduated scale, indicated at 8. It may be remarked that the plug valve 9 does not perform any function in the ordinary operation of the device but the valve 4 is a means for controlling the spray or jet discharged from the pipe 2.

The operation may be described as follows:

The device may be assumed to be in normal operation so that the back pressure in the various tubes or pipes 2 may differ due to opening needle valves 4 to different degrees to spray more liquid in one place than in another. Considering one such pipe and desiring to ascertain or measure the discharge of liquid from it, reference is made to the corresponding scale 8, and the level of the liquid in the tube as shown on the scale 8 indicates the quantity of flow from the pipe or tube 2. If the rate of flow or discharge from the pipe 2 be changed by regulating the valve 4, the static pressure in the chamber 1 correspondingly changes and that change, acting through the column of liquid in the U-tube against the air trapped in the upper end of the arm 7 causes the level of the liquid to occupy a new position in respect to the scale 8. The scale of course is calibrated so that in respect to the level of the liquid in the tube 7 the quantity of flow can be read.

By means of the described device the quantity of liquid sprayed at the center and edge portions of a web or sheet can be adjusted to be different and to be whatever may be required by means of the valves 4, and the gauges provided by the level of the liquid in the tubes 7 as indicated on the scales 8.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. Means for variably adjusting the quantity of liquid which goes to a spray and for measuring the quantity at different adjustments, which comprise a chamber subjected to fluid pressure, a pipe communicating with said chamber and of operatively constant flow area and arranged to discharge against atmospheric pressure, means containing liquid under substantially constant pressure and communicating with said chamber to supply liquid under pressure thereto, a valve regulating the area of the communication from said means to said chamber and which regulation changes the liquid pressure in the chamber for different rates of flow through the pipe of constant flow area, and an upright U-tube containing the same liquid as that whose rate of flow is adjusted and measured and having one end in communication with said chamber and having the other end sealed and containing an air column trapped by the liquid in the lower portion of the U-tube.

2. Means for variably adjusting the quantity of liquid going to each of a plurality of sprays providing a unitary discharge and for measuring the quantity that goes to each spray to adjust the density at different parts of the discharge, which comprise a manifold containing liquid under substantially constant pressure, a series of separate pressure chambers each communicating with the manifold through a fluid way and exposed to fluid pressure, a series of pipes of operatively fixed cross sectional area communicating with said chambers and arranged to discharge against atmospheric pressure, a series of valves for regulating the fluid ways to adjust the quantity of liquid going to each spray and which adjustment changes the pressure in the chambers, and a series of U-tubes having one of their ends in communication with the chambers and the other end sealed and containing an air column adapted to be trapped by the liquid in the lower portions of the U-tubes.

HARRY C. COLE.